United States Patent [19]

Brownscombe

[11] 4,379,908

[45] Apr. 12, 1983

[54] RAPID CURING EPOXY-UNSATURATED MONOMER COMPOSITIONS

[75] Inventor: Thomas F. Brownscombe, Houston, Tex.

[73] Assignee: Shell Oil Company, Houston, Tex.

[21] Appl. No.: 355,082

[22] Filed: Mar. 5, 1982

[51] Int. Cl.³ .................... C08G 59/68; C08G 59/40; C08G 65/02

[52] U.S. Cl. ........................................ 528/91; 528/88; 528/89; 528/92; 528/106; 528/393; 525/529

[58] Field of Search ............... 528/89, 91, 92, 88, 528/106, 393; 525/529

[56] References Cited

U.S. PATENT DOCUMENTS

| | | | |
|---|---|---|---|
| 2,633,458 | 11/1951 | Shokal | 260/45.2 |
| 3,017,387 | 1/1962 | Schwarzer et al. | 528/93 X |
| 3,018,262 | 1/1962 | Schroeder | 528/91 X |
| 3,242,104 | 3/1966 | Brueschweiler et al. | 528/98 X |
| 3,363,241 | 11/1963 | Shokal | 260/2 |
| 3,373,221 | 11/1964 | May | 260/837 |
| 3,377,406 | 4/1968 | Newey et al. | 260/837 |
| 3,803,110 | 4/1974 | Richards et al. | 528/88 X |
| 4,284,753 | 8/1981 | Hewitt | 528/89 |

Primary Examiner—Earl A. Nielsen
Attorney, Agent, or Firm—Norris E. Faringer

[57] ABSTRACT

The present invention provides an curable composition comprising (1) at least one epoxy compound containing at least one vicinal-epoxy groups, (2) a miscible amount of at least one ethylenically unsaturated monomer and (3) a curing amount of at least one catalyst selected from lithium or Group II metal salts of a non-nucleophilic acid.

8 Claims, No Drawings

RAPID CURING EPOXY-UNSATURATED MONOMER COMPOSITIONS

BACKGROUND OF THE INVENTION

Epoxy compositions and their curing techniques are well-known and the patents issued on curable epoxy compositions number in the hundreds. Known curing agents include, among many others, polycarboxylic acids and anhydrides, amines, polyamides, imidazoles, and the like. Representative curing agents are described in U.S. Pat. No. 3,336,241. These curing agents may be employed with one or more catalysts or accelerators such as the stannous salts of monocarboxylic acids.

It will be appreciated that each and every one of the known epoxy-curing systems exhibits advantages over other systems, and, as importantly, disadvantages over the same systems. There is, of course, a continuing need to develop better epoxy curing compositions.

An epoxy system which is not only simple and produces rapid curing, but also produces cured epoxy compositions exhibiting excellent physical properties has been developed. This curable composition comprising (1) an epoxy resin and (2) a curing amount of at least one "hard cation" catalyst is described and claimed in copending patent application Ser. No. 330,412, filed Dec. 14, 1981.

There is a continuing need and desire to modify curable systems in order to maximize physical and/or chemical properties as well as to produce more economical formulations. Accordingly, it has now been found that a portion of the epoxy in the composition of Ser. No. 330,412 can be replaced with one or more compatible comonomers, preferably an ethylenically unsaturated monomer, and more preferably, styrene, without significant reduction in physical properties.

SUMMARY OF THE INVENTION

The present invention provides a curable composition comprising (1) at least one epoxy compound containing at least one vicinal-epoxy group, (2) a miscible amount of at least one ethylenically unsaturated monomer, and (3) a curing amount of at least one catalyst selected from the group consisting of lithium and Group II metal salts of a non-nucleophilic acid.

DESCRIPTION OF THE PREFERRED EMBODIMENT

Suitable polyepoxides useful in the present compositions comprise those compounds containing at least one vicinal epoxy or oxirane group, i.e., at least one

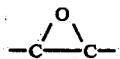

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,373,221 and U.S. Pat. No. 3,377,406 and so much of the disclosure relevant to examples of epoxy compounds is incorporated by reference into this specification.

Preferred polyepoxides are the glycidyl polyethers of polyhydric phenols and polyhydric alcohols, especially the glycidyl polyethers of 2,2-bis(4-hydroxyphenyl)propane having an average molecular weight between about 300 and 3,000 and an epoxide equivalent weight between about 140 and 2,000.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the phenol is Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

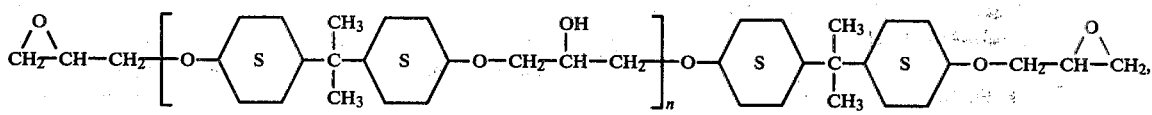

wherein n has a value so that the average molecular weight of the saturated polyepoxide is from about 350 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Other examples include the glycidyl novolac resins, i.e., the phenol-aldehyde condensates, as described in U.S. Pat. No. 2,658,885.

Ethylenically Unsaturated Monomers

The preferred ethylenically unsaturated monomers are the unsaturated aromatic monomers such as styrene, alpha-methyl styrene; halo-substituted styrenes such as chlorostyrene; nitro-substituted styrenes such as nitrostyrene; alkyl-substituted styrenes such as tertiarybutyl styrene; divinylbenzene, vinyl toluene; 2-vinyl pyridine; N-vinyl pyrrolidone, and vinyl naphthalene. Especially preferred is styrene.

Other suitable monomers which are preferably blended with styrene include, (1) esters of ethylenically unsaturated carboxylic acids, (2) cyano-containing unsaturated compounds, (3) allyl-containing compounds, and (4) olefins or diolefins and (5) alkyl phenols.

Suitable unsaturated monocarboxylic acid esters include the alkyl esters of ethylenically unsaturated acids such as acrylic acid, methacrylic acid, crotonic acid, alpha-phenylacrylic acid, itaconic acid, citraconic acid, fumaric acid, cyanoacrylic acid, methoxyacrylic acid, and the like. Very preferred acids are acrylic acid and methacrylic acid. Accordingly, suitable such esters include, methyl methacrylate, ethyl acrylate, butyl acrylate, butyl methacrylate, isobutyl methacrylate, pentaerythritol triacrylate, trimethylolpropane trimethyacrylate, and the like.

Suitable cyano-compounds include acrylonitrile and methacrylonitrile.

Suitable allyl monomers include diallyl phthalate and triallyl isocyanurate.

Suitable phenols include nonyl phenol and lower and higher homologues, and alkylated bisphenol acetone or other diphenols. Other suitable comonomers include the unsaturated aliphatic compounds such as the olefins and diolefins. Operable such olefins and diolefins include ethylene, propylene, butylene, amylene, butadiene, isoprene, vinyl hexane, vinyl cyclohexanes, vinyl cyclohexene, vinyl cyclopentane, vinyl cyclopentene, norbornadiene, cyclopentadiene, cyclopentadiene dimer and the like. It will be appreciated that since some of these monomers are normally gases at ambient temperatures and pressures, their use dictates that the compositions be formulated and cured under pressure conditions. Accordingly, their use is especially useful in the so-called reaction injection molding (RIM) techniques.

As noted hereinbefore, the resinous portion of the composition comprises a miscible amount of polyepoxide and ethylenically unsaturated monomer, usually a blend of a 100 parts by weight polyepoxide and from about 10 to about 200 parts by weight of at least one ethylenically unsaturated monomer. If desired, any of the above defined monomers may be used singly or in blends with one or more comonomers. Compositions exhibiting improved properties comprise a major proportion of an aromatic unsaturated monomer such as styrene.

Catalysts

The hard cation non-nucleophilic anion catalysts useful in the present composition include lithium and Group II metal salts of a nonnucleophilic acid. A "non-nucleophilic" acid is defined herein to mean that (1) a 10% by weight water solution has a pH of <1.0 and (2) the anion portion of the acid does not easily participate in displacement reaction with organic halides.

The preferred Group II metal (alkaline earth metal) salts are calcium and magnesium.

Suitable non-nucleophilic acids include fluoboric, fluoarsenic, fluoantimonic and fluophosphoric acids.

Accordingly, suitable hard cation non-nucleophiic anion salts include, $LiBF_4$, $Ca(BF_4)_2$, $Mg(BF_4)_2$, $LiPF_6$, $Ca(PF_6)_2$, $Mg(PF_6)_2$, $LiSbF_6$, $LiAsF_6$ and the like.

Very preferred hard cation non-nucleophilic anion catalysts are $LiBF_4$ and $Ca(BF_4)_2$.

The amount of catalyst (curing agent) utilized will be a curing or hardening amount. In general, from about 0.05 to about 15 parts per one hundred parts by weight (phr) of polyepoxides is employed with from about 0.1 to about 10.0 phr being preferred, and from about 0.5 phr to about 2.0 phr being especially preferred.

The present compositions may be prepared by various techniques. If, for example, the instant compositions are to be utilized within a short time, they can be simply prepared by mixing all the components, then adding one or more of the customary additives such as solvents; fillers; reinforcement fibers; mats and bars; pigments; flame retardant agents; antioxidants; plasticizers; stabilizers; extenders; thixotropic agents; etc., and then molding and curing the resulting composition. Even more effective curing (hardening) can be achieved when the metal salt is applied to a finely divided inorganic carrier. Simply, the metal salt is suspended in a solvent to which one or more inorganic materials have been added. After blending the components (salt/solvent/inorganic material) the solvent is removed totally or partially, via distillation. The resulting catalyst composition can be used to effectively cure epoxy resins.

Operable solvents include water and the oxy-containing solvents such as the alcohols, glycols and glycol ethers as well as the ketones and other organic solvents. Suitable solvents include tetrahydrofuran (THF), acetone, methyl ethyl ketone (MEK), methyl isobutyl ketone (MIBK), pyran, propylene carbonate, cyclohexanone, acetophenone, diethyl ether, ethylene glycol, OXITOL®, CELLOSOLVE® and CELLOSOLVE® Acetate, morpholine, ethyl alcohol, dimethylsulfoxide (DMSO), sulfolane, ethylene carbonate, dimethylformamide (DMF) and the like.

Suitable inorganic materials include silica gel, alumina, sand, silica flour, CABOSIL®, mica, clays, talcs, glasses, asbestos, gypsum, anhydrous CaSO$_4$, titanium dioxide (TiO$_2$) and the like.

The following examples are given to illustrate the present heat-curable thermosetting compositions. It is understood that the examples are embodiments only and are given for the purpose of illustration and the invention is not to be regarded as limited to any specific components and/or specific conditions recited therein. Unless otherwise indicated, parts and percentages in the examples, are parts and percentages by weight.

Epoxy Resin A is a liquid glycidyl polyether of 2,2-bis-(4-hydroxphenyl)propane having an epoxide equivalent (WPE) of 175-190 and an average molecular weight of about 350.

EXAMPLE I

This example illustrates the preparation of a preferred metal catalyst (curing agent) powder. One gram of LiBF$_4$ was dissolved in 10 grams of OXITOL ®. Then 1 gram of CABOSIL ® was added and stripped under vacuum for 4 hours at 40° C. 3.18 grams of white free-fl owing powder were obtained.

EXAMPLE II 3.9 parts by weight of the catalyst of Example I and 20 parts by weight (Pbw) of styrene were introduced into Kettle B of an Accuratio ™ Reaction Injection Molding (RIM) machine. 100 parts by weight of Polyether A were placed into Kettle B of the Accuration RIM machine. The machine was then operated to produce a final mixture of 100 pbw Polyether A, 20 pbw of styrene and 3.9 pbw of catalyst (1.0 pbw of LiBF$_4$) and injected into a flat plate mold (150 "×8"×10") at 100° C. The mold was opened after 15 minutes and the solid plate removed, having the following properties:

HDT, ° C.: 109
Elongation at Break, %: 2.5
Tensil stress at yield, psi: 4700
Tensile modules, psi: 410,000
Retention of shear moduleus at 70° C., %: 94
Shear modulus, psi: 154,000
Izod impact, ft-#/inch of water: 0.3
Charpy Impact: 0.2

EXAMPLE III

This example illustrates the effectiveness of the present solid salts as curing agents for epoxy-styrene blends.

The components were mixed together and the gel (cure) time was determined at preselected temperatures. The results of representative experiments are tabulated in Table I.

TABLE I

| Polyether A pbw | Styrene pbw | Catalyst/pbw | Solvent/pbw | Cure or Gel Time/Temp, °C. |
|---|---|---|---|---|
| 100 | 25 | Ca(BF$_4$)$_2$/0.5 | Oxitol/1 | 2 minutes @ 20° C. Exothermed in HDT bars |
| 80 | 20 | Ca(BF$_4$)$_2$/1 | Oxitol/2 | 18 seconds @ 20° C. Cured in 10 minutes @ 100° C. |
| 80 | 20 | Mg(BF$_4$)$_2$/1 | Oxitol/3 | 60 seconds @ 40° C. Exothermed to 215° C. in 1 minute |
| 80 | 20 | LiBF$_4$/1 | Oxitol/2 | Cured 2 hours @ 125° C. to produce good casting & HDT bars |
| 80 | 20 | Mg(BF$_4$)$_2$/1 | H$_2$O/2.3 | 135 minutes @ 20° C. in 0.01" film |

What is claimed is:

1. A curable composition comprising (1) at least one epoxy compound containing at least one vicinal epoxy group, (2) a miscible amount of at least one ethylenically unsaturated monomer and (3) a curing amount of at least one metal salt selected from the group consisting of lithium and Group II metal salts of a non-nucleophilic acid.

2. The composition of claim 1 wherein the epoxy compound is a glycidyl polyether of a polyhydric phenol.

3. The composition of claim 2 wherein the polyhydric phenol is 2,2-bis(4-hydroxyphenyl)propane.

4. The composition of claim 1 wherein the lithium salt is LiBF$_4$.

5. The composition of claim 1 wherein the metal salt is an alkaline earth salt of fluoboric acid.

6. The composition of claim 5 wherein the metal salt is Ca(BF$_4$)$_2$ or Mg(BF$_4$)$_2$.

7. The composition as in claim 1 wherein the ethylenically unsaturated monomer is styrene.

8. The composition of claim 7 wherein from about 10 to about 200 parts by weight of styrene is used per 100 parts by weight of epoxy compound.

* * * * *